(12) United States Patent
Behzadi et al.

(10) Patent No.: US 9,336,277 B2
(45) Date of Patent: May 10, 2016

(54) QUERY SUGGESTIONS BASED ON SEARCH DATA

(71) Applicant: Google Inc., Mountain View, CA (US)

(72) Inventors: Behshad Behzadi, Zurich (CH); Evgeny A. Cherepanov, Adliswil (CH); Nils Grimsmo, Adliswil (CH); Aurelien Boffy, Basel (CH); Alessandro Agostini, Zurich (CH); Karoly Csalogany, Zurich (CH); Fredrik Bergenlid, Zurich (CH); Matthias Heiler, Zurich (CH); Marcin M. Nowak-Przygodzki, Zurich (CH)

(73) Assignee: Google Inc., Mountain View, CA (US)

( * ) Notice: Subject to any disclaimer, the term of this patent is extended or adjusted under 35 U.S.C. 154(b) by 151 days.

(21) Appl. No.: 13/906,669

(22) Filed: May 31, 2013

(65) Prior Publication Data

US 2014/0358906 A1 Dec. 4, 2014

(51) Int. Cl.
G06F 17/30 (2006.01)

(52) U.S. Cl.
CPC ........ *G06F 17/3053* (2013.01); *G06F 17/3064* (2013.01); *G06F 17/30684* (2013.01); *G06F 17/30864* (2013.01)

(58) Field of Classification Search
CPC ................ G06F 17/30654; G06F 17/30643; G06F 17/30026
See application file for complete search history.

(56) References Cited

U.S. PATENT DOCUMENTS

| | | | |
|---|---|---|---|
| 6,567,810 B1 | 5/2003 | Singhal | |
| 7,444,324 B2 | 10/2008 | Ortega et al. | |
| 8,065,316 B1 | 11/2011 | Baker et al. | |
| 8,145,623 B1 | 3/2012 | Mehta et al. | |
| 8,423,538 B1 * | 4/2013 | Sadikov et al. | 707/722 |
| 8,688,727 B1 * | 4/2014 | Das et al. | 707/766 |
| 8,762,392 B1 | 6/2014 | Yamauchi | |
| 2008/0082477 A1 * | 4/2008 | Dominowska et al. | 707/1 |
| 2009/0089251 A1 * | 4/2009 | Johnston et al. | 707/3 |
| 2009/0112816 A1 | 4/2009 | Marlow | |
| 2010/0030769 A1 * | 2/2010 | Cao et al. | 707/5 |
| 2010/0299343 A1 * | 11/2010 | Ahari | G06F 17/30702 707/759 |
| 2011/0087686 A1 * | 4/2011 | Brewer et al. | 707/766 |
| 2011/0202533 A1 | 8/2011 | Wang et al. | |

(Continued)

OTHER PUBLICATIONS

"Apple—iOS 6—User your voice to do even more with Siri," downloaded from the Internet on Apr. 29, 2013, http://www.apple.com/ios/siri/, 3 pages.
"Google Beats Siri to the Desktop with Google Now-like voice search for Chrome," downloaded from the internet on May 15, 2013, http://9to5mac.com/2013/05/15/google-beats-siri-to-the-desktop-with-google-now-like-voice-search-for-chrome/, 4 pages.
"Google Now. The right information at just the right time," downloaded from the internet on Apr. 29, 2013, http://www.google.com/landing/now/, 4 pages.

(Continued)

*Primary Examiner* — James Trujillo
*Assistant Examiner* — Giuseppi Giuliani
(74) *Attorney, Agent, or Firm* — Fish & Richardson P.C.

(57) ABSTRACT

Methods, systems, and apparatus, including computer programs encoded on a computer storage medium, for generating query suggestions based on search data. In one aspect, a method includes receiving, by one or more computers, a first query, determining query refinements based on the first query, generating, from the query refinements, refinement clusters, each refinement cluster corresponding to a particular topic and each refinement cluster including query refinements that are determined to belong to the particular topic to which the refinement cluster corresponds, ranking the refinement clusters, and selecting the refinement cluster that is highest in the ranking relative to other refinement clusters in the ranking as a first search refinement cluster for the first query.

16 Claims, 4 Drawing Sheets

(56) References Cited

U.S. PATENT DOCUMENTS

2012/0253802 A1    10/2012  Heck et al.
2012/0259829 A1    10/2012  Zhou
2013/0282704 A1*   10/2013  Pantel et al. .................. 707/723
2013/0326353 A1*   12/2013  Singhal .......................... 715/728
2014/0081633 A1*    3/2014  Badaskar ....................... 707/769

OTHER PUBLICATIONS

International Search Report and Written Opinion in International Application No. PCT/US2014/038743, mailed Sep. 5, 2014, 11 pages.

* cited by examiner

QUERY SUGGESTIONS BASED ON SEARCH DATA

BACKGROUND

This specification relates to systems receiving a query and determining topical prompts based on the query.

The Internet provides access to a wide variety of resources, for example, video files, image files, audio files, or Web pages, including content for particular subjects, book articles, or news articles. A search system can select one or more resources in response to receiving a search query. A search query is data that a user submits to a search engine to satisfy the user's informational needs. The search queries are usually in the form of text, e.g., one or more query terms, and may also include transcriptions of spoken search queries. The search system selects and scores resources based on their relevance to the search query and on their importance relative to other resources to provide search results. The search results are typically ordered according to the scores and presented according to this order.

SUMMARY

In general, one innovative aspect of the subject matter described in this specification can be embodied in methods that include the actions of receiving, by one or more computers, a first query, determining query refinements based on the first query, generating, from the query refinements, refinement clusters, each refinement cluster corresponding to a particular topic and each refinement cluster including query refinements that are determined to belong to the particular topic to which the refinement cluster corresponds, ranking the refinement clusters, selecting the refinement cluster that is highest in the ranking relative to other refinement clusters in the ranking as a first search refinement cluster for the first query, and generating first topic prompt data based on the topic associated with the first search refinement cluster, the first topic prompt data describing a request for a first user input of an n-gram that belongs to the topic associated with the first search refinement cluster. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. In some implementations, a search engine accesses a query log and determines a topic prompt for a received query based on prior queries or sequences of queries that meet a threshold level of similarity to the query, thereby reducing the amount of user input on a user device. In some implementations, the search engine restricts topic prompts to reduce the likelihood of topic drift, thereby providing suggestions that are more likely to satisfy users' informational needs. The suggestions can be presented in a dialog context related to a topic instead of a particular query suggestion. In some implementations this dialog may contain pictures or ideograms for selection, or groups of search results for different query refinement choices. The ability to refine a query using a topic prompt in such a dialog context enables a user to input queries in a more fluid, conversational manner, which, in turn, results in ease of use of the search engine by the users and may guide the user to the search results required by the user more quickly. This may allow for completely hands-free operation of a search engine in situations or on devices where typing corrections to queries is impossible or impractical.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

Sometimes when a user enters a search query, the search results presented to the user are not what the user was looking for and the user must revise the search query. For example, a user may query for "restaurants in San Francisco," view search results, and then query for "Italian restaurants in San Francisco." The latter query revision may be particularly difficult to input when the user is interacting by means of spoken queries or text queries on a mobile platform, as input methods are often limited on such devices.

The systems and methods described below facilitate the refinement of queries in a fluid and intuitive manner. When a search system receives a first query from a user device, the search system retrieves other queries from a log where the other queries meet a threshold level of similarity to the first query, determines query refinements for the first query where the query refinements are from the other queries, clusters the query refinements where each refinement cluster is associated with a refinement topic, and selects one or more refinement cluster topics based on the refinement clusters. The search system may provide the refinement cluster topics based on the selected refinement cluster topics as topic prompts to a user to allow the user to refine the search results that are provided to the user device.

For example, when the user requests "restaurants in San Francisco," the search system may determine that previous queries for restaurants often included a cuisine type (e.g., based on the clusters), provide search results to the user, and prompt the user "which type of cuisine are you looking for?" When the user responds to the system prompt with "I am looking for French," the system provides the user with search results responsive to "French restaurants in San Francisco," and may include an additional query refinement, such as prompting the user for a specific location in San Francisco.

§1.1 Example Operating Environment

Figure 1A:
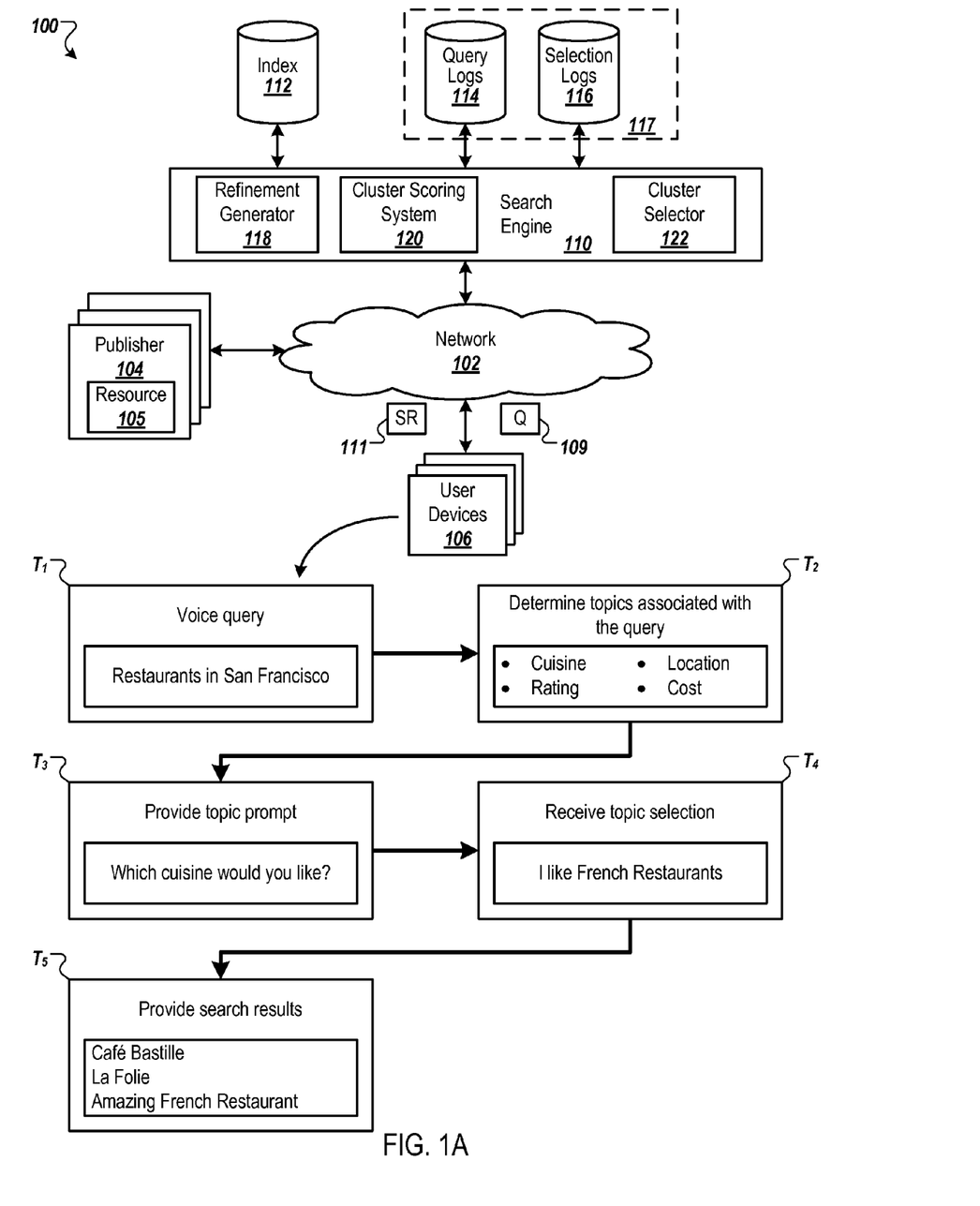
FIGS. 1A-B are a block diagram of an example environment for determining topic prompts based on a query.

FIG. 1 is a block diagram of an example environment 100 for determining topic prompts based on a query. A user response to a topic prompt allows the user refine the query without entering in a new query and provides the user with search results responsive to both the query and the topic prompt response.

A computer network 102, such as a local area network (LAN), wide area network (WAN), the Internet, or a combination thereof, connects publisher websites 104, user devices 106, and a search engine 110. The online environment 100 may include many thousands of publisher websites 104 and user devices 106.

A publisher website 104 includes one or more resources 105 associated with a domain and hosted by one or more servers in one or more locations. Generally, a website is a collection of web pages formatted in hypertext markup language (HTML) that can contain text, images, multimedia content, and programming elements, for example, scripts. Each publisher website 104 is maintained by a content publisher, which is an entity that controls, manages and/or owns the publisher website 104.

A resource is any data that can be provided by a publisher website 104 over the network 102 and that has a resource address, e.g., a uniform resource locator (URL). The resources 105 may be HTML pages, electronic documents, images files, video files, audio files, and feed sources, to name just a few. The resources may include embedded information, e.g., meta information and hyperlinks, and/or embedded instructions, e.g., client-side scripts.

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102. The web browser can enable a user to display and interact with text, images, videos, music and other information typically located on a web page at a website on the World Wide Web or a local area network.

To facilitate searching of these resources 105, the search engine 110 identifies the resources by crawling the publisher websites 104 and indexing the resources 105 provided by the publisher websites 104. The resources 105 are indexed and the index data are stored in an index 112.

The user devices 106 submit search queries 109 to the search engine 110. The search queries 109 are submitted in the form of a search request that includes the search request and, optionally, a unique identifier that identifies the user device 106 that submits the request. The unique identifier can be data from a cookie stored at the user device, or a user account identifier if the user maintains an account with the search engine 110, or some other identifier that identifies the user device 106 or the user using the user device.

In response to the search request, the search engine 110 uses the index 112 to identify resources that are relevant to the queries. The search engine 110 identifies the resources in the form of search results and returns the search results to the user devices 106 in a search results page resource 111. A search result is data generated by the search engine 110 that identifies a resource or provides information that satisfies a particular search query. A search result for a resource can include a web page title, a snippet of text extracted from the web page, and a resource locator for the resource, e.g., the URL of a web page.

The search results are ranked based on scores related to the resources identified by the search results, such as information retrieval ("IR") scores, and optionally a separate ranking of each resource relative to other resources (e.g., an authority score). The search results are ordered according to these scores and provided to the user device according to the order.

The user devices 106 receive the search results pages 111 and render the pages for presentation to users. In response to the user selecting a search result at a user device 106, the user device 106 requests the resource 105 identified by the resource locator included in the selected search result. The publisher of the publisher website 104 hosting the resource 105 receives the request for the resource from the user device 106 and provides the resource 105 to the requesting user device 106.

In some implementations, the search queries 109 submitted from user devices 106 are stored in query logs 114. Selection data for the queries and the web pages referenced by the search results and selected by users are stored in selection logs 116. The query logs 114 and the selection logs 116 define search history data 117 that include data from and related to previous search requests associated with unique identifiers. The selection logs represent actions taken responsive to search results provided by the search engine 110. The query logs 114 and selection logs 116 can be used to map queries submitted by user devices to resources that were identified in search results and the actions taken by users when presented with the search results in response to the queries. In some implementations, data are associated with the identifiers from the search requests so that a search history for each identifier can be accessed. The selection logs 116 and query logs 114 can thus be used by the search engine to determine the respective sequences of queries submitted by the user devices 106, the actions taken in response to the queries, and how often the queries have been submitted.

The search engine 110 uses the query logs and the sequences of queries to determine query refinements made to search queries during search sessions. For example, the search engine 110 determines that a user may modify an initial search query with a cuisine type, such as French or Italian, or with a price range, to name a few.

§1.2 Topic Prompts

The search engine 110 uses these query refinements to determine topic prompts for later search sessions. For example, at time $T_1$, a user enters a search query of "Restaurants in San Francisco" and the user's device 106 provides the search query to the search engine 110.

A refinement generator 118 selects query refinements for the query using the search history data 117, such as the query logs 114, where the query refinements meet a threshold level of similarity with the query. For example, the refinement generator 118 selects the query refinements "Italian restaurants in San Francisco," "French restaurants in San Francisco," "Japanese restaurants in San Francisco," "restaurants in San Francisco near union square," and "Japanese restaurants in San Francisco near the pier."

At time $T_2$, the refinement generator 118 determines refinement clusters for the query refinements, where each refinement cluster is associated with a topic from the query refinements. For example, the refinement generator 118 clusters the query refinements by type and selects a "cuisine" refinement cluster based on the n-grams "Italian," "French," and "Japanese" in the query refinements, and a "location" refinement cluster based on the n-grams "near union square" and "near the pier." Here, the cuisine refinement cluster includes the query refinements "Italian restaurants in San Francisco," "French restaurants in San Francisco," "Japanese restaurants in San Francisco," and "Japanese restaurants in San Francisco near the pier," and the location refinement cluster includes the query refinements "restaurants in San Francisco near union square," and "Japanese restaurants in San Francisco near the pier."

The n-grams can be a contiguous sequence of n items from a given sequence of text. Each of the n items can be phonemes, syllables, letters, words, numerals, or base pairs to name a few examples. The value of n can vary, such as one for a unigram, two for a bi-gram, and so on.

The refinement generator 118 provides the refinement clusters to a cluster scoring system 120 which scores each of the refinement clusters. For example, the cluster scoring system 120 associates the cuisine refinement cluster with the highest score and the location refinement cluster with a lower score based on a quantity of occurrences of n-grams in the query refinements that are associated with the respective cluster topics.

A cluster selector 122 selects the refinement cluster with the highest score and generates a topic prompt based on the refinement cluster. For example, the cluster selector 122 selects the cuisine refinement cluster and generates a topic prompt "Which cuisine would you like?" Alternatively, a set of the n-highest scoring clusters can be selected, and a topic prompt for each cluster can be generated.

The search engine 110 receives the topic prompt from the cluster selector 122 and, at time $T_3$, provides the topic prompt to the user's device 106. For example, the user's device 106 provides a verbal prompt to the user asking "Which cuisine would you like?"

In some implementations, at time $T_3$, the search engine provides the user's device with search results responsive to the query. For example, the search engine 110 selects search results responsive to the query "Restaurants in San Francisco" and provides the search results to the user's device 106 with the topic prompt "Which cuisine would you like?"

The search engine 110, at time $T_4$, receives a topic selection associated with the topic prompt from the user's device 106. For example, the user responded to the topic prompt with "I like French Restaurants" and the search engine 110 receives the user response "I like French Restaurants." In some implementations, when the user input is spoken input, the search engine 110 receives a transcription of the user input from a transcriber. Alternatively or in addition, a choice of sub-topics can be shown to the user. For example, in the example of FIG. 1, the choices of "French," "Japanese," etc. can be shown.

The search engine 110 determines search results responsive to the query and the user response and, at time $T_5$, provides the search results to the user's device 106. For example, the search engine 110 selects search results responsive to a revised query "French restaurants in San Francisco," including the search results "Café Bastille," "La Folie," and "Amazing French Restaurant," and provides the search results to the user's device 106.

§2.0 Example System Process Flow

Figure 1B:
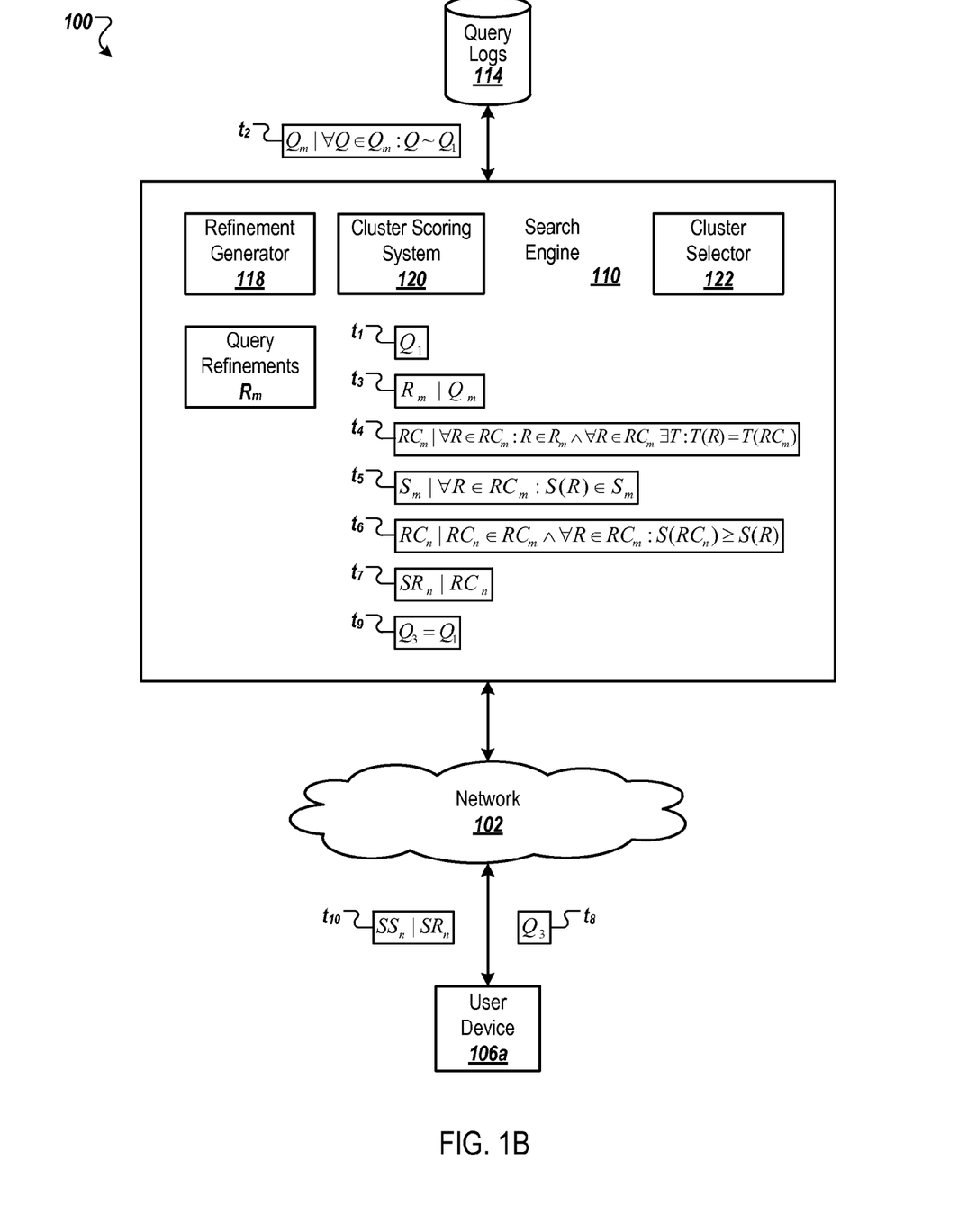

FIG. 1B is a more detailed illustration for a topic prompt flow. While some of the operations described below are described as occurring prior to receipt of a query from a user device 106a, in some implementations, all of the operations may be performed after receipt of a query from the user device 106a and in response to the query. For example, the search engine 110 may receive a query from the user device 106a, select query refinements based on the query, determine one or more topic prompts for the query, and provide a topic prompt to the user device 106a. However, for illustrative purposes, most of the processes below are described as occurring prior to receipt of a query from the user device 106a. For example, for certain queries that meet a frequency threshold (e.g., popular queries), refinement clusters can be generated in advance, etc.

In FIG. 1B, the refinement generator 118 at time $t_1$ selects a first query $Q_1$. For example, the refinement generator 118 selects a commonly occurring query $Q_1$ from the query logs 114. In one example, the refinement generator 118 selects "Restaurants in San Francisco" as the first query $Q_1$.

Alternatively, the refinement generator 118 selects a query from the query logs 114 that is often refined (e.g., meets a refinement frequency threshold) by a user during a search session. For example, based on prior search sessions that have an initial query of "Restaurants in San Francisco" and query refinements "Italian restaurants in San Francisco," "French restaurants in San Francisco," "Japanese restaurants in San Francisco," "restaurants in San Francisco near union square," and "Japanese restaurants in San Francisco near the pier" during a same search session, the refinement generator 118 selects "Restaurants in San Francisco" as the first query $Q_1$.

At time $t_2$, the refinement generator 118 retrieves second queries $Q_m$ from the query logs 114, where each query in the second queries $Q_m$ meets a threshold level of similarity to the first query. A variety of appropriate processes can be used to determine whether the second queries $Q_m$ are similar to the first query $Q_1$. For example, the refinement generator 118 may determine the similarity based on the first query $Q_1$ and the second queries $Q_m$ having a similar classification, such as technology related queries, or queries for specific types of stores such as restaurants or retail shops. The similarity may be based on the search engine 110 receiving the second queries $Q_m$ during a same search session as the first query $Q_1$, or the search engine 110 receiving the queries from the same user device during different search sessions, to name a few.

For example, the refinement generator 118 selects the queries "Restaurants in New York," "Restaurants in San Francisco," "Mexican restaurants in New York," "Italian restaurants in San Francisco," "French restaurants in San Francisco," "Japanese restaurants in San Francisco," "restaurants in San Francisco near union square," and "Japanese restaurants in San Francisco near the pier," from the query logs 114 as the second queries $Q_m$ where all of the queries are associated with a similar classification of queries for restaurants. Further, the first query "Restaurants in San Francisco" is included in the second queries $Q_m$.

The refinement generator 118 determines at time $t_3$ query refinements $R_m$ for each of the second queries $Q_m$. For example, based on the second queries $Q_m$ above, the refinement generator selects "Italian restaurants in San Francisco," "French restaurants in San Francisco," "Japanese restaurants in San Francisco," "restaurants in San Francisco near union square," and "Japanese restaurants in San Francisco near the pier" as the query refinements $R_m$, where the queries for "restaurants in New York" are not included in the query refinements $R_m$ based on the n-gram "New York." Alternate methods may include the query "Mexican restaurants in New York" as a query refinement as discussed in more detail below.

At time $t_4$, the refinement generator 118 clusters the query refinements $R_m$ based on topics associated with the query refinements $R_m$ to create refinement clusters $RC_m$. Each of the query refinements R in the refinement clusters $RC_m$ are from the query refinements $R_m$, and for every query refinement R in a specific one of the refinement clusters, one of the topics of the query refinement R is the same as the topic of the specific refinement cluster. A variety of appropriate clustering algorithms can be used to create the clusters.

For example, the refinement generator 118 creates a "cuisine" refinement cluster with the topic "cuisine" and the query refinements "Italian restaurants in San Francisco," "French restaurants in San Francisco," "Japanese restaurants in San Francisco," and "Japanese restaurants in San Francisco near the pier" based on the n-grams "Italian," "French," and "Japanese," where all of the query refinements in the cuisine refinement cluster have a pattern similar to "$cuisine_type restaurants in San Francisco." The refinement generator 118 also creates a "location" refinement cluster with the topic "location" and the query refinements "restaurants in San Francisco near union square," and "Japanese restaurants in San Francisco near the pier" based on the n-grams "near union square" and "near the pier," where all of the query refinements in the location refinement cluster have a pattern similar to "restaurants in San Francisco near $location." The cluster types can, in some implementations, be emergent, e.g., the clusters are not predefined. The cluster type variable is selected based on the cluster name, e.g., for cuisine, the variable is $cuisine_type, and so on. A query refinement can be generated based on the variable type and appropriate natural language processes. For example, a value for "$cuisine_type" is an adjective that modifies "restaurants" and thus a natural language process generates the refinement "$cuisine_type restaurants in San Francisco."

The cluster scoring system 120 scores each of the refinement clusters $RC_m$ at time $t_5$ such that the set of scores $S_m$ includes a score for each refinement cluster R in the refinement clusters $RC_m$. For example, the cluster scoring system 120 scores the refinement clusters $RC_m$ based on a quantity of occurrences of n-grams in the query refinements that are associated with the particular cluster topic. In this example, the cluster scoring system 120 associates the cuisine refinement cluster with a score of four based on one occurrence of both "Italian" and "French" and the two occurrences of "Japanese," and the location refinement cluster with a score of two based on one occurrence of both "near union square" and "near the pier."

Alternatively, the cluster scoring system 120 may score the refinement clusters $RC_m$ based on the unique occurrence of n-grams. For example, the cluster scoring system 120 associates the cuisine refinement cluster with a score of three based on the n-grams "Italian," "French," and "Japanese" and the location refinement cluster with a score of two based on the n-grams "near union square" and "near the pier." In other implementations, the cluster scoring system 120 uses a different method for scoring the refinement clusters $RC_m$.

The cluster selector 122 ranks the refinement clusters $RC_m$ based on the scores $S_m$ associated with the refinement clusters $RC_m$, determines at time $t_6$ the refinement cluster $RC_n$ from the refinement clusters $RC_m$ that has a score greater than the scores for the other refinement clusters R in the refinement clusters $RC_m$, and, at time $t_7$, selects the refinement cluster $RC_n$ as a first search refinement $SR_n$ for the first query $Q_1$. For example, the cluster selector 122 determines that the cuisine refinement cluster has a score of four and the location refinement cluster has a score of two and selects "cuisine type" as the first search refinement $SR_n$. The search engine 110 may then perform a search operation, based on the first query $Q_1$, using the first search refinement $SR_n$.

In some implementations, the search operation includes providing a topic prompt to a user device. For example, at time $t_8$, the search engine 110 receives a third query $Q_3$ from the user device 106a. The search engine 110, at time $t_9$, determines that the third query $Q_3$ is the same as the first query $Q_1$, and provides, at time $t_{10}$, a search suggestion $SS_n$ as a topic prompt to the user device 106a where the search suggestion $SS_n$ is based on the first search refinement $SR_n$. For example, the search engine 110 receives a query $Q_2$ "Restaurants in San Francisco" from the user device 106a, determines that the first search refinement $SR_n$ of cuisine type is associated with the query $Q_2$ based on $Q_2$ being the same as $Q_1$, and provides the search suggestion "Which cuisine would you like?" to the user device 106a.

In certain implementations, the search engine 110 ranks subtopics associated with a refinement cluster topic and provides the top ranked subtopics to the user device 106a as potential search refinements for a topic prompt. For example, the cluster selector 122 determines the n-grams included in query refinements in a cuisine refinement cluster that are associated with the cuisine topic, clusters similar n-grams based on similar subtopics (e.g., Japanese, Italian, French, etc.), ranks the subtopics, and selects the highest ranked subtopics as selection categories that the search engine 110 may provide to the user device 106a.

In one example, for the cuisine refinement cluster, the cluster selector 122 selects the subtopics of Japanese, Italian, and French, ranks the subtopics based on the occurrence of n-grams associated with a particular subtopic occurring in the cuisine refinement cluster, and provides one or more of the top ranked subtopics to the search engine 110. When the cluster selector 122 determines that Japanese, French, and Italian are the highest ranked subtopics for the cuisine refinement cluster, the search engine 110 may provide the user device 106a with a topic prompt "Which cuisine would you like—Japanese, French, Italian or some other type of cuisine?" The user device 106a may present the topic prompt to a user in a graphical user interface (e.g., where each subtopic is associated with a subtopic selection option) or as a verbal prompt. A variety of appropriate clustering algorithms can be used to create the subtopic clusters and a variety of appropriate ranking algorithms can be used to rank the subtopics.

§3.0 Example Query Server Process Flows

Figure 2:
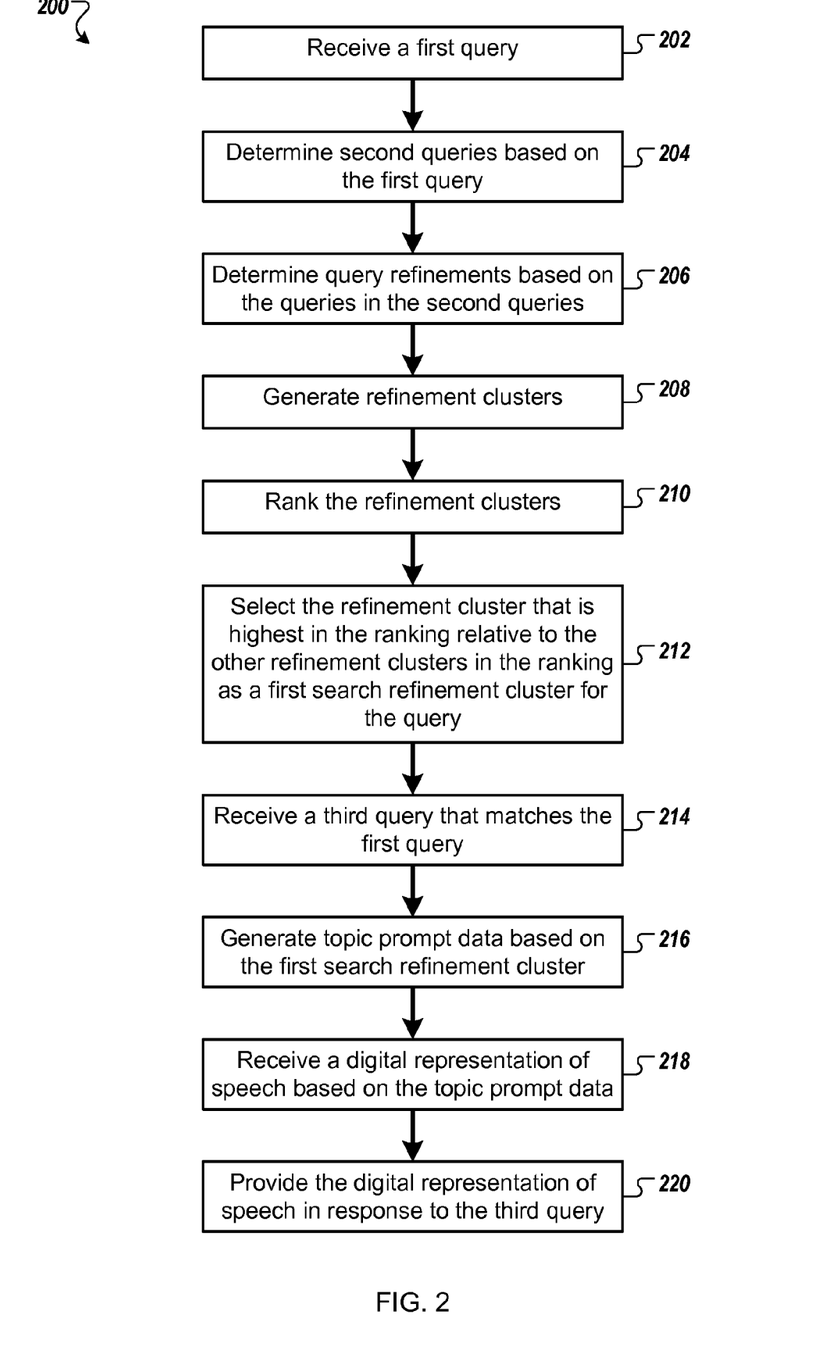
FIG. 2 is a flow diagram of a process for providing a topic prompt in response to receiving a query.

FIG. 2 is a flow diagram of a process 200 for providing a topic prompt data in response to receiving a query. The process 200 can be used by the search engine 110 of FIGS. 1A-B to provide the topic prompt data to the user device 106a.

The process 200 receives a first query (202). For example, the search engine determines the queries that occur most frequently in the query logs and selects the first query from the queries that occur most frequently in the query logs. For example, the search engine selects the query "Restaurants in San Francisco" from the query logs, where the selection is made independently from the search engine receiving the first query from a user.

The process 200 determines second queries based on the first query (204). Each of the second queries is a query that meets a threshold level of similarity to the first query. For example, the similarity may be based on queries that include all of the n-grams from the first query, or queries that have a general topic that is the same as the first query (e.g., restaurant queries, queries for a specific type of technology, etc.), to name a few.

The process 200 determines query refinements based on the queries in the second queries (206). For each of the second queries, the refinement generator determines query refinements based on the second query. For example, the refinement generator selects the query refinements $R_m$ that are refinements of the first query $Q_1$ from the second queries $Q_m$. Each query in the query refinements $R_m$ may be a query that was input as a refinement for the first query $Q_1$ in a prior user session or that includes all of the n-grams from the first query $Q_1$ or similar n-grams, to name a few. In some implementations, each query in the query refinements $R_m$ is a query that was input after the first query $Q_1$ and without an intervening query during a user session.

Alternatively, the refinement generator selects the query refinements $R_m$ based on the first query $Q_1$ when the process does not include the step 204. For example, when the refinement generator determines that a query log includes more than a threshold quantity of query refinements for the first query $Q_1$, the refinement generator uses the query refinements of the first query as the query refinements $R_m$ instead of query refinements of the second queries.

The process 200 generates refinement clusters (208). The refinement clusters are generated from the query refinements, each refinement cluster corresponds to a particular topic, and each refinement cluster includes query refinements that are determined to belong to the particular topic to which the refinement cluster corresponds. For example, the refinement generator creates the refinement clusters $RC_m$ based on the different topics associated with the queries in the query refinements $R_m$ such that an individual query refinement may be included in more than one of the refinement clusters $RC_m$.

In some implementations, the refinement generator selects topics for the refinement clusters $RC_m$ where there are no n-grams associated with any of the topics that are also included in the first query $Q_1$. For example, the refinement generator selects the query refinement "French restaurants in San Francisco," determines that the topic "cuisine" is not associated with an n-gram in the first query "Restaurants in San Francisco" while the topics "city" (e.g., San Francisco) and "service type" (e.g., restaurant) are included in the first query $Q_1$, and creates a cuisine refinement cluster.

The process 200 ranks the refinements clusters (210). For example, the cluster scoring system associates a score with each of the refinement clusters $RC_m$ based on the query refinements included in the respective refinement cluster. For example, the cluster scoring system associates a highest score with the cuisine refinement cluster.

The process 200 selects the refinement cluster that is highest in the ranking relative to the other refinement clusters in the ranking as a first search refinement cluster for the query (212). For example, the cluster selector determines that the first search refinement cluster $SR_n$ is associated with the highest score of the clusters in the refinement clusters $RC_m$ and the search engine performs a search operation using the first search refinement cluster $SR_n$ and based on the first query $Q_1$ by continuing the process 200. For example, the cluster selector determines that the cuisine refinement cluster is associated with the highest score and selects the cuisine refinement cluster as the first search refinement cluster $SR_n$.

The cluster selector stores data associated with the first query $Q_1$ and the first search refinement cluster $SR_n$ in memory for later use. For example, the search engine performs steps 202 to 212 using query logs prior to receiving the first query $Q_1$ from a user device during a search session and providing the first search refinement cluster $SR_n$ to the user device during the same search session. The search engine may perform the steps 202 to 212 and store the first search refinement cluster $SR_n$ in memory to reduce computation for queries that are often received by the search engine. Alternatively, the search engine may perform the steps 202 to 212 in response to receiving the first query $Q_1$ from a user device.

The process 200 receives a third query that matches the first query (214). For example, the refinement clusters are generated prior to query time and stored in memory, and at query time the search engine receives the third query $Q_3$ from a user device, determines that the third query $Q_3$ is the same as the first query $Q_1$, and retrieves the refinement clusters from memory.

Alternatively, the search engine may determine that the third query $Q_3$ is substantially the same as, or is similar to, the first query $Q_1$. For example, the search engine determines that search results responsive to the third query $Q_3$ are also responsive to the first query $Q_1$ in the same order. In one example, the search engine determines that the query "San Francisco restaurants" is substantially the same as the query "Restaurants in San Francisco."

The process 200 generates topic prompt data based on the first search refinement cluster (216). The topic prompt data may be based on the topic associated with the first search refinement cluster, and may describe a request for a first user input of an n-gram that belongs to the topic associated with the first search refinement cluster. For example, the search engine creates the search suggestion $SS_n$ as the topic prompt data using the first search refinement cluster $SR_n$ and based on the first query $Q_1$. Here the search operation performed by the search engine is the generation of the topic prompt data. For example, when the first search refinement cluster $SR_n$ is a cuisine refinement cluster, the search engine generates the topic prompt data "Which cuisine would you like?"

The process 200 receives a digital representation of speech based on the topic prompt data (218). For example, the search engine provides the topic prompt data to a speech generation system that creates the digital representation of speech for the topic prompt data and provides the digital representation of speech to the search engine.

The process 200 provides the digital representation of speech in response to the third query (220). For example, the search engine provides the digital representation of speech to the user device and the user device plays the digital representation of speech to a user to present the user with the topic prompt data.

The order of steps in the process 200 described above is illustrative only, and the selection and delivery of a topic prompt data can be done in different orders. For example, the process 200 may receive the third query prior to determining the second queries based on the first query. In another example, the process may generate the topic prompt data based on the first refinement cluster prior to receiving the third query $Q_3$.

In some implementations, the process 200 can include additional steps, fewer steps, or some of the steps can be divided into multiple steps. For example, the search engine may perform the steps 202 through 212 without performing one or more of the steps 214 through 220. Alternatively, the search engine may perform the stems 202 and 206 through 212. For example, the search engine determines query refinements based on the first query instead of the queries in the second queries.

In one example, the search engine may request the digital representation of speech from the speech generation system prior to receiving the digital representation of speech.

In another example, the search operation performed by the search engine includes providing the topic prompt data to a user device where the third query and the user device are associated with the same user session. For example, the search engine provides the search suggestion "Which cuisine would you like?" to the user device.

The search engine receives a selection of an n-gram that belongs to the topic associated with the first search refinement cluster, where the selection is associated with the same user session as the third query and the selection is subsequent to the third query without other intervening user input for the user session. For example, the selection indicates that a user of the user device wants search results for French restaurants.

The search engine then provides search results responsive to the first query and the selection to the user device. For example, the search engine provides search results responsive to "French restaurants in San Francisco" to the user device.

In some implementations, when the refinement generator determines that a minimum quantity of query refinements have not been determined in step 206, the refinement generator repeats step 206. For example, if the refinement generator first determines query refinements based on the first query where the quantity of the query refinements is not greater than the minimum quantity of query refinements, the refinement generator may then determine query refinements based on the second queries or other queries similar to the second queries. The refinement generator may repeat step 206, expanding on the queries used to identify query refinements, until the minimum quantity of query refinements has been determined.

In certain implementations, the minimum quantity of query refinements is determined based on a minimum number of query refinements required for generation of the refinement clusters.

Figure 3:
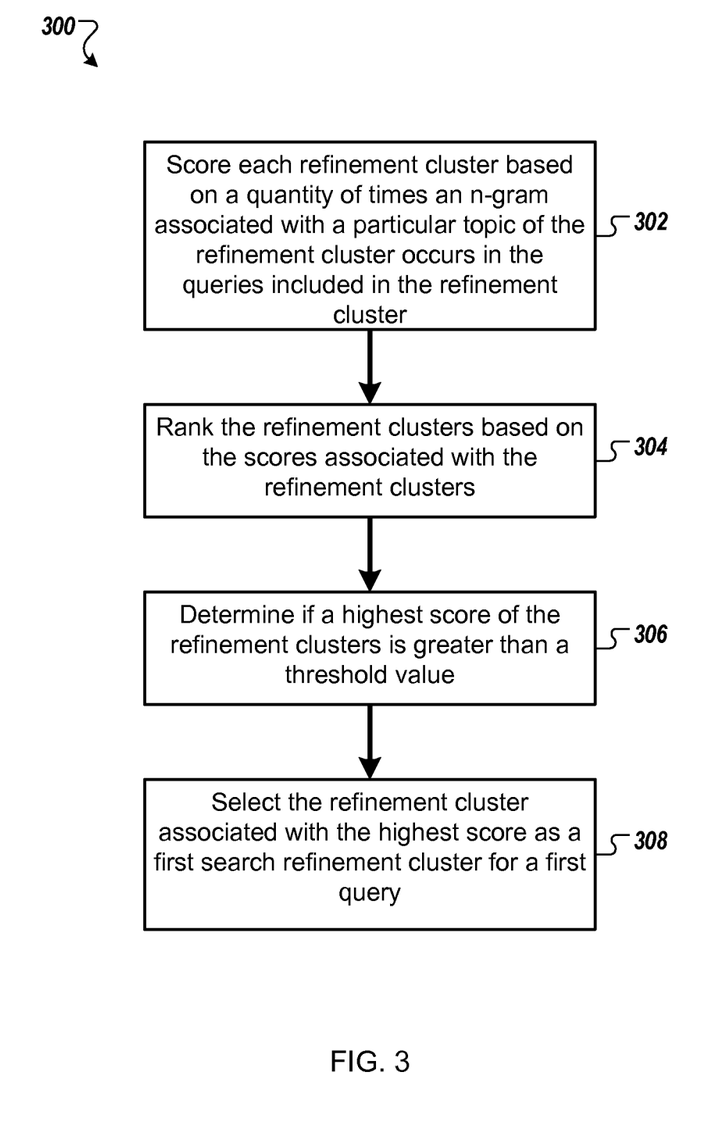
FIG. 3 is a flow diagram of a process for selecting a topic prompt based on a score associated with the topic prompt.

FIG. 3 is a flow diagram of a process 300 for selecting topic prompt data based on a score associated with the topic prompt data. The process 300 can be used by the search engine 110 of FIGS. 1A-B to score query refinement clusters and select a top scoring refinement cluster. For example, when the search engine 110 performs the process 200, the search engine 110 can perform the process 300 instead of the steps 210 and 212.

The process 300 scores each refinement cluster based on a quantity of times an n-gram associated with a particular topic of the refinement cluster occurs in the queries included in the refinement cluster (302). For example, for each query refinement in a particular one of the refinement clusters $RC_m$, the cluster scoring system analyzes the n-grams in the query refinement to determine whether the n-gram corresponds to the topic of the particular refinement cluster. When the cluster scoring system locates n-grams in the query refinements that correspond to the topic of the particular refinement cluster, the cluster scoring system increases the score for the particular refinement cluster.

The process 300 ranks the refinement clusters based on the scores associated with the refinement clusters (304). The refinement cluster that is highest in the ranking relative to the other refinement clusters having a highest score of the refinement clusters. For example, the cluster selector selects a highest scoring refinement cluster that has the highest score of the refinement clusters $RC_m$.

The process 300 determines if a highest score of the refinement clusters is greater than a threshold value (306). For example, the cluster selector compares the highest score for the highest scoring refinement cluster with the threshold score value and determines whether the highest score is greater than the threshold score value.

If the highest score is greater than the threshold value, the process 300 selects the refinement cluster associated with the highest score as a first search refinement cluster for a first query (308). For example, the cluster selector determines that the highest score is greater than the threshold score value and selects the highest scoring refinement cluster $RC_n$.

In some implementations, the process 300 can include additional steps, fewer steps, or some of the steps can be divided into multiple steps. For example, the search engine may provide multiple topic prompts to a user device after scoring the refinement clusters.

Specifically, after selecting the highest scoring refinement cluster as the first search refinement cluster, the search engine receives a third query that matches the first query and is for a user session associated with a user device. For example, the search engine receives the query "Restaurants in San Francisco" from the user device.

The search engine provides the user device with first topic prompt data for the user session where the search engine generates the first topic prompt data based on the topic associated with the first search refinement cluster, and the first topic prompt data describes a request for a first user input of an n-gram that belongs to the topic associated with the first search refinement cluster. For example, the search engine provides a first search suggestion "Which cuisine would you like?" to the user device where the first search refinement cluster is a cuisine refinement cluster.

The search engine receives a first selection for the user session where the first selection of an n-gram that belongs to the topic associated with the first search refinement cluster. For example, the search engine receives the selection "I like French restaurants" from the user device.

The search engine provides second topic prompt data to the user device and for the user session where the search engine generates the second search suggestion based on the topic associated with a second search refinement cluster that has a second highest score of the refinement clusters $RC_m$, and the second topic prompt data describes a request for a second user input of an n-gram that belongs to the topic associated with the second search refinement cluster. For example, the search engine determines the second highest score for a second highest scoring refinement cluster in the refinement clusters $RC_m$. The search engine compares the second highest score with the threshold score value, determines that the second highest score is greater than the threshold value, generates the second topic prompt data based on the second highest scoring refinement cluster, and provides the second topic prompt data to the user device. Here the search engine may provide the user device with a second search suggestion "Is there a specific location you are looking for?" based on a location refinement cluster being associated with the second highest score.

Alternatively, the search engine selects the second topic prompt data based on query refinements determined from the combination of the first query and the first selection. For example, when the first query is "Restaurants in San Francisco" and the first selection is "I like French restaurants," the search engine selects the second topic prompt data based on the highest ranking query refinement for the query "French restaurants in San Francisco."

The search engine receives a second selection of an n-gram that belongs to the topic associated with the second search refinement cluster where the second selection is received consecutively after the first selection without any intervening user input and is associated with the user session. For example, the search engine receives a second selection of "near union square."

The search engine determines search results responsive to the first query, the first selection, and the second selection and provides the search results to the user device associated with the user session. For example, the search engine determines search results responsive to the query "French restaurants in San Francisco near union square" and provides the search results to the user device.

The search engine may repeat the refinement process by providing additional topic prompt data to the user device until the search engine determines that there are no additional topic prompts that meet a threshold level of relevance for either the first query or a combination of the first query and the selections received from the user device.

§3.1 Additional Scoring and Selection Details

In some implementations, the refinement generator determines refinement clusters for a query based on queries that are similar to the first query but do not contain all of the n-grams from the first query. For example, when the first query is "Restaurants in San Francisco," the refinement generator includes "Mexican restaurants in New York" and "French restaurants in Los Angeles" in the query refinements $R_m$. Here the refinement generator identifies a base query pattern of "restaurants in $city" where "$city" is a variable that represents any city name that is included in a query from the query logs. When the refinement generator determines that a query matches the base query pattern, the refinement generator includes the query in the query refinements $R_m$ and the refinement clusters $RC_m$ for determining the search refinement $SR_n$.

This allows the search engine to receive any first query of the form "restaurants in $city" and select a topic prompt using the query refinements $R_m$. For example, the search engine may receive the queries "Restaurants in San Francisco" and "Restaurants in New York" and use the same topic prompts (e.g., the search suggestions $SS_n$) for both queries. Further, when a particular query does not have any query refinements, the search engine uses a pattern for that particular query to locate query refinements for similar queries that can also be used for the particular query.

In some implementations, when the refinement generator uses a base query pattern, the refinement generator scores the refinement clusters $RC_m$ based on whether the value of the variable in the query refinements is similar to the value from the first query. For example, when the first query is "Restaurants in San Francisco," the query refinement "French restaurants in San Francisco" will be associated with a greater weight value than the query refinements "French restaurants in Los Angeles" and "Restaurants in New York near union square" when the refinement clusters $RC_m$ are ranked.

In some implementations, the search engine scores each of the refinement clusters $RC_m$ based on a level of similarity between an n-gram in a query refinement and the first query $Q_1$. For example, when the first query is "Restaurants in San Francisco," a query refinement "French restaurants in San Francisco" is associated with a higher weight value than a query refinement "French cafes in San Francisco" for a cuisine refinement cluster.

In some implementations, the cluster scoring system uses the location of a user device when scoring the refinement clusters $RC_m$. For example, query refinements that are received from user devices in the same region as the user device that provided the first and second queries may be associated with a higher weight value.

In some implementations, the cluster scoring system uses a search history associated with a user device and/or a user of the user device when scoring the refinement cluster $RC_m$. For example, query refinements that the search engine previously received from the user device, or are similar to query refinements received from the user device, are associated with a higher weight value than other query refinements.

In some implementations, when the search engine selects multiple topic prompts to provide to a user device, if the search engine receives a response to a first topic prompt that is responsive to a second topic prompt, the search engine does not provide the second topic prompt to the user device. For example, the search engine selects the search suggestions "Which cuisine would you like?" and "Is there a specific location you are looking for?" and provides the search suggestion "Which cuisine would you like?" to a user device. When the search engine receives a response from the user device, such as "French restaurants near the pier" or "restaurants near the pier" where a user specifies additional search restrictions in the response or search restrictions that are not associated with the search suggestion, respectively, the search engine compares the search restrictions to the second search suggestion of "Is there a specific location you are looking for?," determines that data responsive to the search suggestion has been received, and does not provide the second search suggestion to the user device. The search engine may then provide additional topic prompts (e.g., search suggestions) to the user device, depending on whether the additional topic prompts meet a threshold level of relevance for the first query (e.g., based on the threshold score value) or a combination of the first query and the responses received from the user device.

In some implementations, the search operation performed by the search engine with first search refinement cluster includes generation of a topic specific question. For example, when the first search refinement cluster is a cuisine refinement cluster, the search engine may generate the question "Do you want French restaurants in San Francisco?" as a topic prompt and provide the question to a user device. The search engine may select the question based on previous queries associated with a user or a user device that provided the first query to the search engine. For example, the search engine uses the search history data to determine that the user typically searches for French restaurants.

The selection received by the search engine in response to the question may be a short yes or no response or may be more detailed. For example, the search engine receives a response such as "Yes, near the pier" and uses the additional location information to identify search results responsive to "French Restaurants in San Francisco near the pier." In another example, when the search engine receives a response of "No, look for Chinese restaurants," the search engine identifies search results responsive to "Chinese restaurants in San Francisco."

§4.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   determining, by one or more computers, query refinements for a first query;
   generating, from the query refinements, refinement clusters, each refinement cluster corresponding to a particular topic included in the queries in the refinement cluster and not included in the first query and each refinement cluster including query refinements that are determined to belong to the particular topic to which the refinement cluster corresponds;
   scoring each of the refinement clusters using a quantity of unique n-grams associated with the particular topic of the refinement cluster that occur in the queries included in the refinement cluster, wherein, for each of the refinement clusters, a score for the refinement cluster counts each of the unique n-grams once;
   ranking the refinement clusters based on the scores associated with the refinement clusters, the refinement cluster that is highest in the ranking relative to the other refinement clusters having a highest score of the refinement clusters;
   selecting the refinement cluster that is highest in the ranking relative to other refinement clusters in the ranking as a first search refinement cluster for the first query;
   generating first topic prompt data based on the topic associated with the first search refinement cluster, the first topic prompt data describing a question that comprises a request for a first user input of an n-gram that is a subtopic of the topic associated with the first search refinement cluster;
   receiving, for a user session, the first query;
   providing, for the user session, the first topic prompt data in response to receipt of the first query;
   receiving, for the user session, data indicating a particular n-gram that is i) a subtopic of the topic associated with the first search refinement cluster and ii) an answer to the topic prompt data, the receipt of the data indicating the particular n-gram subsequent to the receipt of the first query without other intervening user input for the user session; and
   providing, for the user session, search results responsive to the first query and the particular n-gram.

2. The method of claim 1, further comprising:
   determining, by the one or more computers, second queries based on the first query, each of the second queries being a query that meets a threshold level of similarity to the first query, the first query being one of the second queries; and
   for each of the second queries, determining the query refinements based on the second query.

3. The method of claim 1, comprising:
   receiving a digital representation of speech based on the first topic prompt data, wherein providing, for the user session, the first topic prompt data in response to receipt of the first query comprises providing, for the user session, the digital representation of speech.

4. The method of claim 1, wherein selecting the refinement cluster that is highest in the ranking comprises:
   determining if the highest score is greater than a threshold value; and
   selecting, based on determining that the highest score is greater than the threshold value, the refinement cluster that is highest in the ranking relative to the other refinement clusters as the first search refinement cluster for the first query.

5. The method of claim 1, further comprising:
   providing, for the user session, second topic prompt data based on the topic associated with a second search refinement cluster that has a second highest score of the refinement clusters or a highest scoring combination refinement cluster for a combination of the first query and the particular n-gram, the second topic prompt data describing a request for a second user input of an n-gram that belongs to the topic associated with the second search refinement cluster;
   receiving, for the user session, data indicating a second particular n-gram that belongs to the topic associated with the second search refinement cluster; and
   providing, for the user session, search results responsive to the first query, the particular n-gram, and the second particular n-gram.

6. The method of claim 5, wherein the highest score and the second highest score are above a threshold value.

7. A non-transitory computer readable storage medium storing instructions executable by a data processing apparatus and upon such execution cause the data processing to perform operations comprising:
   determining, by one or more computers, query refinements for a first query;
   generating, from the query refinements, refinement clusters, each refinement cluster corresponding to a particular topic included in the queries in the refinement cluster and not included in the first query and each refinement cluster including query refinements that are determined to belong to the particular topic to which the refinement cluster corresponds;
   scoring each of the refinement clusters using a quantity of unique n-grams associated with the particular topic of the refinement cluster that occur in the queries included in the refinement cluster, wherein, for each of the refinement clusters, a score for the refinement cluster counts each of the unique n-grams once;
   ranking the refinement clusters based on the scores associated with the refinement clusters, the refinement cluster that is highest in the ranking relative to the other refinement clusters having a highest score of the refinement clusters;
   selecting the refinement cluster that is highest in the ranking relative to other refinement clusters in the ranking as a first search refinement cluster for the first query;
   generating first topic prompt data based on the topic associated with the first search refinement cluster, the first topic prompt data describing a question that comprises a request for a first user input of an n-gram that is a subtopic of the topic associated with the first search refinement cluster;
   receiving, for a user session, the first query;
   providing, for the user session, the first topic prompt data in response to receipt of the first query;
   receiving, for the user session, data indicating a particular n-gram that is i) a subtopic of the topic associated with the first search refinement cluster and ii) an answer to the topic prompt data, the receipt of the data indicating the particular n-gram subsequent to the receipt of the first query without other intervening user input for the user session; and providing, for the user session, search results responsive to the first query and the particular n-gram.

8. The non-transitory computer readable storage medium of claim 7, the operations further comprising:

determining second queries based on the first query, each of the second queries being a query that meets a threshold level of similarity to the first query, the first query being one of the second queries; and for each of the second queries, determining the query refinements based on the second query.

9. The non-transitory computer readable storage medium of claim 7, wherein selecting the refinement cluster that is highest in the ranking comprises:

determining if the highest score is greater than a threshold value; and selecting, based on determining that the highest score is greater than the threshold value, the refinement cluster that is highest in the ranking relative to the other refinement clusters as the first search refinement cluster for the first query.

10. The non-transitory computer readable storage medium of claim 7, the operations further comprising:

providing, for the user session, second topic prompt data based on the topic associated with a second search refinement cluster that has a second highest score of the refinement clusters or a highest scoring combination refinement cluster for a combination of the first query and the particular n-gram, the second topic prompt data describing a request for a second user input of an n-gram that belongs to the topic associated with the second search refinement cluster;

receiving, for the user session, data indicating a second particular n-gram that belongs to the topic associated with the second search refinement cluster; and providing, for the user session, search results responsive to the first query, the particular n-gram, and the second particular n-gram.

11. The non-transitory computer readable storage medium of claim 10, wherein the highest score and the second highest score are above a threshold value.

12. A system, comprising:

a data processing apparatus; and a non-transitory computer readable storage medium in data communication with the data processing apparatus and storing instructions executable by the data processing apparatus and upon such execution cause the data processing to perform operations comprising:

determining, by one or more computers, query refinements for a first query;

generating, from the query refinements, refinement clusters, each refinement cluster corresponding to a particular topic included in the queries in the refinement cluster and not included in the first query and each refinement cluster including query refinements that are determined to belong to the particular topic to which the refinement cluster corresponds;

scoring each of the refinement clusters using a quantity of unique n-grams associated with the particular topic of the refinement cluster that occur in the queries included in the refinement cluster, wherein, for each of the refinement clusters, a score for the refinement cluster counts each of the unique n-grams once;

ranking the refinement clusters based on the scores associated with the refinement clusters, the refinement cluster that is highest in the ranking relative to the other refinement clusters having a highest score of the refinement clusters;

selecting the refinement cluster that is highest in the ranking relative to other refinement clusters in the ranking as a first search refinement cluster for the first query;

generating first topic prompt data based on the topic associated with the first search refinement cluster, the first topic prompt data describing a question that comprises a request for a first user input of an n-gram that is a subtopic of the topic associated with the first search refinement cluster;

receiving, for a user session, the first query;

providing, for the user session, the first topic prompt data in response to receipt of the first query;

receiving, for the user session, data indicating a particular n-gram that is i) a subtopic of the topic associated with the first search refinement cluster and ii) an answer to the topic prompt data, the receipt of the data indicating the particular n-gram subsequent to the receipt of the first query without other intervening user input for the user session; and providing, for the user session, search results responsive to the first query and the particular n-gram.

13. The system of claim 12, the operations further comprising:

determining second queries based on the first query, each of the second queries being a query that meets a threshold level of similarity to the first query, the first query being one of the second queries; and for each of the second queries, determining the query refinements based on the second query.

14. The system of claim 12, wherein selecting the refinement cluster that is highest in the ranking comprises:

determining if the highest score is greater than a threshold value; and selecting, based on determining that the highest score is greater than the threshold value, the refinement cluster that is highest in the ranking relative to the other refinement clusters as the first search refinement cluster for the first query.

15. The system of claim 12, the operations further comprising:

providing, for the user session, second topic prompt data based on the topic associated with a second search refinement cluster that has a second highest score of the refinement clusters or a highest scoring combination refinement cluster for a combination of the first query and the particular n-gram, the second topic prompt data describing a request for a second user input of an n-gram that belongs to the topic associated with the second search refinement cluster;

receiving, for the user session, data indicating a second particular n-gram that belongs to the topic associated with the second search refinement cluster; and providing, for the user session, search results responsive to the first query, the particular n-gram, and the second particular n-gram.

16. The system of claim 15, wherein the highest score and the second highest score are above a threshold value.

* * * * *